United States Patent
Ramaswamy

(10) Patent No.: US 6,546,050 B2
(45) Date of Patent: Apr. 8, 2003

(54) VIDEO ENCODING METHOD AND APPARATUS

(75) Inventor: Srinath Venkatachalapathy Ramaswamy, Cranbury, NJ (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 10/145,221

(22) Filed: May 14, 2002

(65) Prior Publication Data

US 2002/0168012 A1 Nov. 14, 2002

Related U.S. Application Data

(62) Division of application No. 09/394,358, filed on Sep. 10, 1999, now Pat. No. 6,480,539.

(51) Int. Cl.[7] .................................................. H04N 7/12
(52) U.S. Cl. .................................................. 375/240.03
(58) Field of Search ............................. 348/700, 701; 375/240.01–240.07, 240.24–240.26, 240.28; 382/232, 236, 251; 725/32; H04N 7/12

(56) References Cited

U.S. PATENT DOCUMENTS

| | | | |
|---|---|---|---|
| 5,136,376 A | 8/1992 | Yagasaki et al. ............ 358/133 |
| 5,144,424 A | 9/1992 | Savatier ...................... 358/133 |
| 5,331,348 A | 7/1994 | Knauer et al. ............... 348/402 |
| 5,534,944 A | 7/1996 | Egawa et al. ................ 348/584 |
| 5,793,431 A | 8/1998 | Blanchard ................... 348/423 |
| 5,859,660 A | 1/1999 | Perkins et al. .................. 348/9 |
| 5,917,830 A | 6/1999 | Chen et al. .................. 370/487 |
| 5,982,436 A | 11/1999 | Balakrishnan et al. ...... 348/409 |
| 6,038,000 A | 3/2000 | Hurst, Jr. ..................... 348/845 |
| 6,049,569 A | 4/2000 | Radha et al. ................ 375/240 |
| 6,208,691 B1 | 3/2001 | Balakrishnan et al. . 375/240.12 |
| 6,229,851 B1 | 5/2001 | Cotton ................... 375/240.25 |
| 6,298,089 B1 | 10/2001 | Gazit ..................... 375/240.28 |
| 6,330,286 B1 | 12/2001 | Lyons et al. ........... 375/240.28 |
| 6,380,991 B1 * | 4/2002 | Teichmer ............... 375/240.26 |
| 6,414,998 B1 * | 7/2002 | Yoshinari et al. ...... 375/240.25 |
| 6,459,811 B1 * | 10/2002 | Hurst, Jr. ..................... 382/232 |

FOREIGN PATENT DOCUMENTS

| | | | |
|---|---|---|---|
| CA | 2218160 | 4/1998 | |
| WO | WO 98/44737 | 10/1998 | ............ H04N/7/24 |

OTHER PUBLICATIONS

Y. Wang et al., "1997 IEEE First Workshop on Multimedia Signal Processing", Jun. 23–25, 1997, Princeton, NJ, pp. 224–230.

M. Knee et al., "Seamless Concatenation—A 21st Century Dream", Article found at http://www.bbc.co.uk/atlantic/montpap.htm.

T. Akiyama et al., "MPEG2 Video Codec Using Image Compression DSP", IEEE Transactions on Consumer Electronics, vol. 40, No. 3, Aug. 1994, pp. 466–472.

C. Basile et al., "The U.S. HDTV standard The Grand", IEEE Spectrum, Apr. 1995, pp. 36–45.

* cited by examiner

Primary Examiner—Richard Lee
(74) Attorney, Agent, or Firm—Joseph S. Tripoli; Ronald H. Kurdyla; Guy H. Eriksen

(57) ABSTRACT

An exemplary video encoder is provided that quantizes pel blocks of a video signal based upon one or more of the following: (i) an actual bit distribution of a previously encoded video frame, (ii) a required decoding delay for a splice point, and (iii) an activity measure of a pel block being encoded. Moreover, an exemplary video encoder uses the above quantization techniques to obtain an encoded video stream having seamless in points and seamless out points. Video encoding methods that utilize the above quantization methods are also provided.

7 Claims, 8 Drawing Sheets

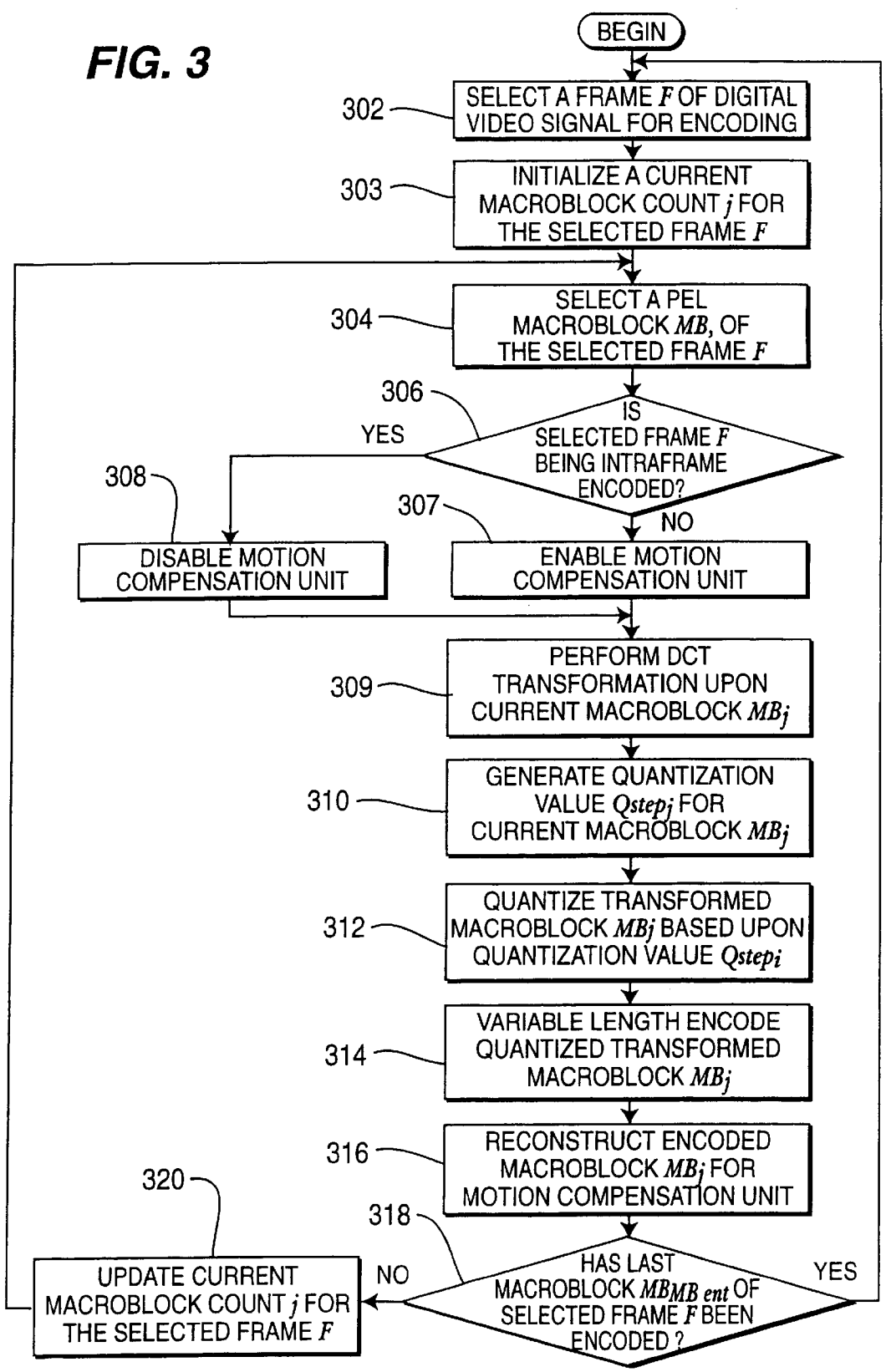

VIDEO ENCODING METHOD AND APPARATUS

CROSS REFERENCE TO RELATED APPLICATIONS

This application is a divisional of application Ser. No. 09/394,358, filed Sep. 10, 1999 now U.S. Pat. No. 6,480,539.

This invention was made with Government support under Contract No. 70NANB5H1174 awarded by the National Institute of Standards and Technology. The Government has certain rights in this invention.

FIELD OF THE INVENTION

The present invention relates generally to video data processing, and more particularly, to video encoding that dynamically adjusts the quantization used to encode a video signal.

BACKGROUND OF THE INVENTION

In the United States and elsewhere, standards for digital television have incorporated, at least in part, the Moving Picture Experts Group or MPEG signal protocol. The MPEG-2 systems standard is described in "ISO/IEC 13818-1" and the MPEG-2 video compression standard is described in "ISO/IEC 13818-2."

The MPEG-2 standard defines a complex syntax which contains a mixture of data and control information. Some of this control information is used to define signals having several different formats including images, having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group pictures layer, the picture layer, the slice layer, the macro block layer, and the block layer. Each of these layers is introduced with control information and "stuffing" characters. The stuffing characters are inserted as needed to ensure that the data rate of the input data stream matches the rate at which pictures are displayed.

To effectively receive the digital images, a decoder must recognize the control portions, extract the necessary control information, and use the extracted data to process the video signal information. One piece of information that is specified for each sequence layer is the video buffering verifier (VBV) buffer size. The VBV buffer size value specifies a number of bits of input data from the video sequence which must be stored in the input buffer of the decoder before the video sequence may be decoded. If this number of bits is stored when the decoding operation begins, the input buffer will neither become too full (overflow) or become empty (underflow) during the processing of the video sequence.

In the production of TV programming, it is desirable to perform video splicing, which is the insertion of material from one program or commercial into another program. The different program materials may vary in complexity and thus require different coding parameters such as VBV buffer size. It should be appreciated that it is not convenient to change VBV buffer size each time program material is spliced, in order to avoid VBV buffer overflow or underflow.

In general, splicing of MPEG bit streams requires managing buffer fullness of the video buffers. Moreover, the buffer fullness corresponds to a delay representative of the amount of time that a byte spends in the buffer. When splicing two separately encoded bit streams, the delay at the splice point will not usually match. This mismatch in delay can cause the video buffer of the video decoder to overflow or underflow.

Further, image quality is essential to satisfying consumer demand for high definition television signals. Tight control over the fullness level of the video buffer is essential to encoding a video signal having splice points which satisfy the constraints of the SMPTE 312M standard proposed by the Society of Motion Picture and Television Engineers (SMPTE). Thus there is a need for a splicing method and system that obviates changes of VBV buffer size at splice points, while precluding buffer overflow or underflow.

SUMMARY OF THE INVENTION

The present invention fulfills the above need, as well as others, by providing a video encoder with a rate control processor suitable for splicing. In general, an exemplary embodiment includes a rate control processor providing a quantizer with appropriate quantization values for respective blocks of the video signal being encoded. To this end, the rate control processor is operable to (i) allocate a target number of bits to the first video frame that precedes a desired splice point in presentation order, (ii) determine an estimated decoding delay for a second video frame of the video signal that follows the desired splice point in encode order, and/or (iii) determines a correction factor based upon a difference between the estimated decoding delay and a splice point decoding delay that is required to achieve a seamless splice point at the desired splice point.

An exemplary method of encoding a video signal according to the present invention calculates the quantization requirements for a first video signal into which a second video signal will be spliced, according to the volume of coded information of both video signals.

BRIEF DESCRIPTION OF THE DRAWINGS

FIG. 3 shows a flowchart of an encoding method used by the video encoder of FIG. 1.

DETAILED DESCRIPTION OF THE INVENTION

Figure 1:
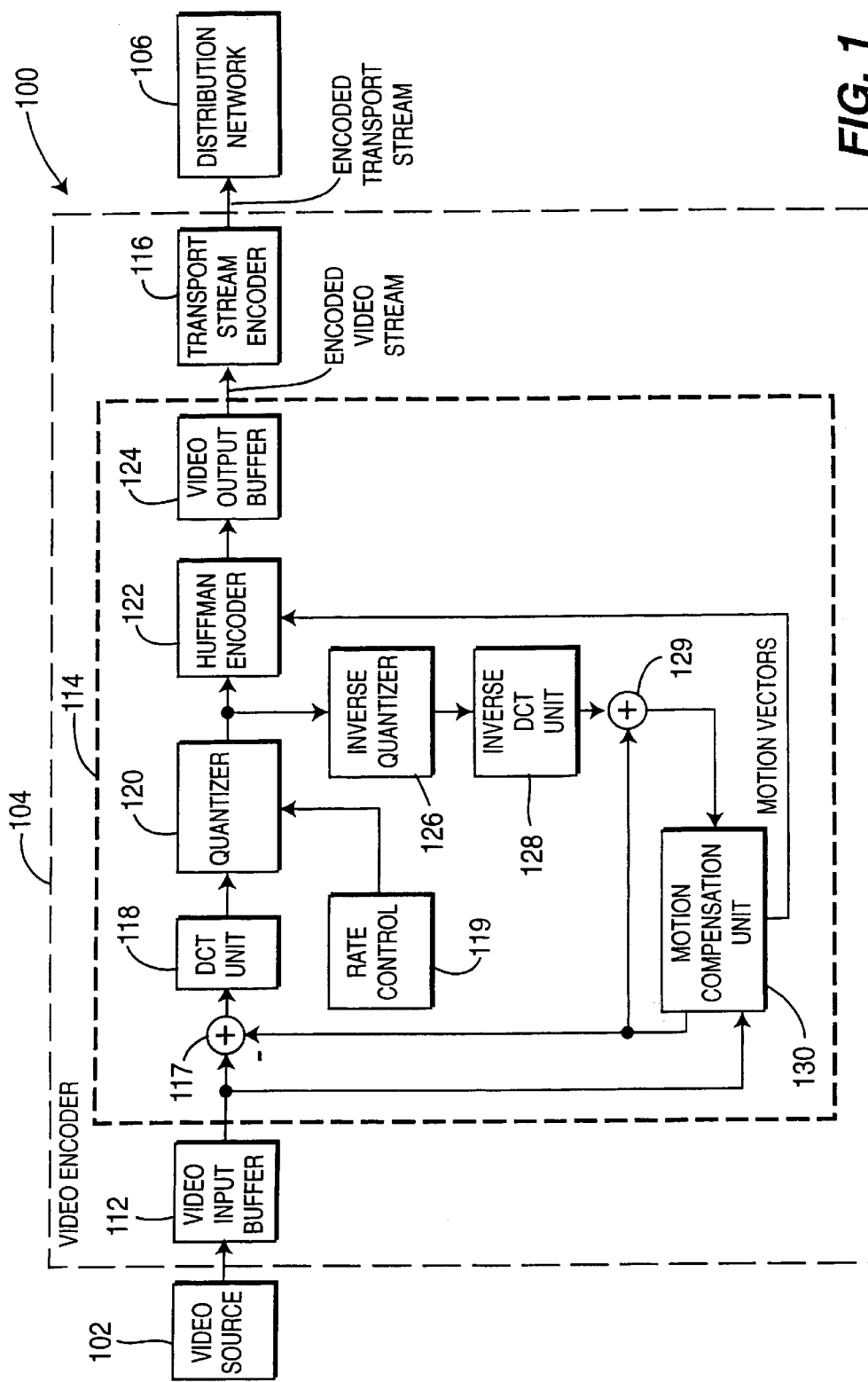
FIG. 1 shows a block diagram of a compressed video delivery system and a video encoder incorporating features of the present invention.

FIG. 1 illustrates a block diagram of video delivery system 100. In particular, the video delivery system 100 includes a video source 102, a compressed video encoder 104, and a distribution network 106. In general, the video source 102 is operable to generate a video signal having a series of video frames or picture and may be implemented with, for example, a digital video camera that produces a series of digital video frames.

The compressed video encoder 104 is operable to compress the video signal produced by the video source 102 and to format the compressed video signal for delivery over the distribution network 106. The distribution network 106 in general delivers the compressed video signal to video receivers (not shown) which in turn decompress and display the video signal. It should be appreciated that the distribution network 106 may be implemented using various communication technologies and topologies such as CATV distribution networks, satellites, television antennae, to name but a few.

Referring to FIG. 1 in more detail, the compressed video transmitter 104 includes a video input buffer 112, a video encoder 114, and a transport stream encoder 116. The video input buffer 112 is operable to buffer video frames produced by the video source 102 until the video encoder 114 is able to encode the video frame. Moreover, the transport stream encoder 116 is operable to receive a compressed video stream from the video encoder 114, format the stream according to, for example, a MPEG system level protocol, and multiplex the formatted video stream with an associated audio stream and other encoded video streams. In this manner, the transport stream encoder 116 is operable to provide video receivers (not shown) coupled to the distribution network 106 with multiple programs from which to choose.

Except for the Rate Control element, the compression and formatting circuitry is similar to known circuitry, such as is described in the articles DIGITAL TERRESTRIAL HDTV FOR NORTH AMERICA: THE GRAND ALLIANCE HDTV SYSTEM or MPEG2 VIDEO CCODEC USING IMAGE COMPRESSION DSP, both of which are found in IEEE Transactions on Consumer Electronics, Vol. 40, No. 3, August 1994, and thus will not be described in detail. Suffice it to say that the video encoder 114 is generally operable to encode video frames, provided from the buffer 112, in such a manner that the encoded video frames are represented with less bits than the original video frame To this end, the video encoder 114 includes a DCT unit 118, a quantizer 120, a Huffman encoder 122, and a video output buffer 124. The DCT unit 118 generally performs an 8×8 discrete cosine transform upon each 8×8 pel block of a video frame to generate 8×8 blocks of DCT coefficients that represent the frequency information contained in the original 8×8 pel block. The frequency information is typically concentrated in a few DCT coefficients in respective blocks with the remaining DCT coefficients being close to or equal to zero.

Furthermore, the exemplary embodiment of video encoder 114 illustrated in FIG. 1 includes an inverse quantizer 126 receiving input from the quantizer 120 output. The inverse quantizer 126 output is coupled to an inverse DCT unit 128, which in turn is an input to summing node 129. Summing node 129 output is coupled as input to a motion compensation unit 130. The motion compensation unit 130 also receives an input from the output of the video input buffer 112. The motion compensation unit 130 provides an output and is coupled to the Huffman Encoder 122, summing node 117, and summing node 129. Summing node 117 receives a second input from the video input buffer 112 and its output is coupled as an input to the DCT unit 118.

The quantizer 120 operates to quantize the 8×8 DCT block based upon a programmable quantization value Qstep.

As a result of quantizing the 8×8 DCT block, more of the DCT coefficients become equal to zero. A further consequence of quantization is that the remaining nonzero DCT coefficients converge to fewer possible values. The greater the quantization value Qstep the fewer possible values to which the DCT coefficients may converge and the fewer number of bits needed to represent the 8×8 DCT block. Accordingly, by adjusting the quantization value Qstep, the quantizer 120 effectively controls the number of bits required to represent the video signal. A variable length encoder e.g., a Huffman encoder 122, variable length encodes the resulting quantized DCT blocks.

The intraframe and interframe coding techniques performed by the encoder 114 produce different quantities of output data for each encoded video frame. However, since the encoded video signal is ordinarily transmitted by the transport stream encoder 116 at a constant bit rate (CBR), the video encoder 114 may include a video output buffer 124 in order to buffer the difference between the (CBR) transmission and the variable bit rate (VBR) encoding of the video frames.

The quantizer is controlled by a rate control processor 119 which implements a rate control method 400 that is described in detail below in reference FIGS. 4A–4C. The rate control processor 119 essentially increases the quantization value Qstep of the quantizer 120 in order to reduce the fullness level of the video buffers. Conversely, the rate control algorithm essentially decreases the quantization value Qstep of the quantizer 120 in order to increase the fullness level of the video buffers. In an exemplary embodiment of the present invention, the rate control processor 19 utilizes actual bit distributions of previously encoded video frames in order to better predict the number of bits required to encode a current video frame. Moreover, the rate control processor 119 in an exemplary embodiment further takes into account the complexity of a pel macroblock when adjusting the quantization value Qstep used to encode the pel macroblock. More specifically, the rate control processor 119 attempts to allocate more bits to complex macroblocks and less bits to less complex macroblocks. In this manner, the rate control processor 119 attempts to achieve encoded video frames having a better distribution of bits and a better image quality than encoded video frames produced by other video encoders.

During splicing of program material, the rate control processor 119 of the exemplary video encoder 114 operates across a larger set of video frames than previous rate control methods. In particular, the rate control processor 119 of the exemplary video encoder 114 operates across multiple groups of pictures (GOPs) whereas prior rate control methods operated across only a single GOP.

By spreading the rate control operation across more GOPs, the video encoder 114 of the exemplary embodiment attempts to achieve encoded video frames having better image quality than video encoders were able to achieve with prior rate control methods. Spreading the rate control operation across multiple GOPs is especially useful in achieving an encoded video stream having seamless splice points. A large adjustment to the quantization value Qstep may be required if only a single GOP were used to achieve the buffer fullness level required for a seamless splice point. This large adjustment may greatly decrease the image quality of the video frames of the GOP. However, by spreading the adjustment to the quantization value Qstep across multiple GOPs, a less dramatic adjustment to the quantization value Qstep may be achieved thus resulting in better overall and consistent image quality for the encoded video stream.

Group of Picture Structure

Figure 2:
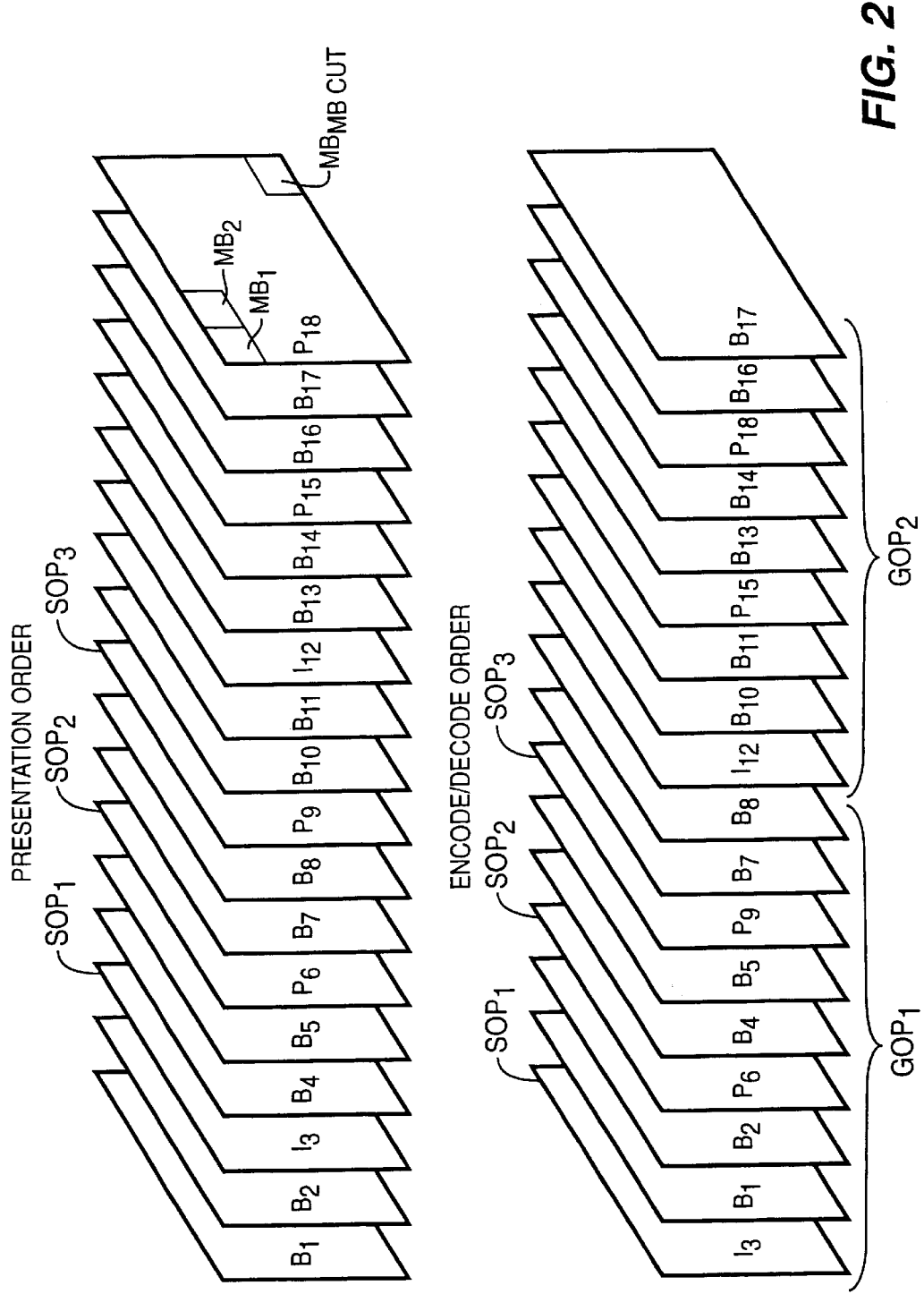
FIG. 2 shows a series of video frames in presentation order and in encode/decode order.

As defined by the MPEG-2 standard a GOP is a basic access unit comprising one I-frame as an entry point and one or more P-frames and B-frames. FIG. 2 illustrates exemplary N=9, M=3 GOPs $GOP_1$ and $GOP_2$ in both presentation order and encode/decode order. In particular, the exemplary GOPs $GOP_1$ and $GOP_2$ each include nine (N=9) video frames of which every third (M=3) video frame is an anchor video frame (I-frame or P-frame). Each macroblock of an I-frame is intraframe encoded. Accordingly, a video stream decoder may decode an I-frame (e.g. $I_3$ and $I_{12}$) without reference to other video frames of the video stream. Each macroblock of a P-frame, however, may be intraframe encoded or interframe encoded based upon a prior reference video frame (in the sense of presentation order) which may be either an I-frame or P-frame. Accordingly, in order to decode a P-frame, a video decoder must first decode the appropriate reference video frame for the P-frame.

Each macroblock of a B-frame may be intraframe encoded or interframe encoded based upon either a prior or a future (or both) reference video frame (in the sense of presentation order) which may be an I-frame or a P-frame.

The transmission order of frames is seen to be different from the display order. For example, the P-frame $P_6$ is transmitted prior to the B-frame $B_4$ even though the B-frame $B_4$ is displayed prior to the P-frame $P_6$. This is necessary because the decoder must decode the P-frame $P_6$ prior to decoding B-frame $B_4$. While a B-frame may be interframe encoded based upon a past reference video frame, the video encoder 114 preferably interframe encodes B-frames preceding a splice-in point in presentation order (e.g. B-frames $B_{10}$ and $B_{11}$) based solely on future video frames (e.g. I-frame $I_{12}$) so that the interframe encoded B-frames are not dependant upon a previous GOP and may be decoded after entering the video stream at the splice in point.

Shown in FIG. 3 is a simplified flowchart of an exemplary encoding method implemented by the video encoder 114 of the present invention. In encoding a video signal, the video encoder 114 commonly implements a repetitive GOP structure such as the N=9M=3 GOP structure depicted in FIG. 2. The flow chart is generally self explanatory to those skilled in the art of compressed video signal processing, and will be described only briefly with the exception of step 310 GENERATE QUANTIZATION VALUE $Q_{step}$, to effect rate control.

Beginning with step 302, a frame (F) of the digital video signal is selected for encoding. In accordance with step 303 a current macroblock count (j) is initialized for the selected frame (F). In accordance with with step 304, PEL macroblock (MB) is selected from selected frame (F). Step 306 involves an evaluation as to whether or not frame (F) is to be intraframe decoded. If frame (F) will not be intraframe decoded, then in accordance with step 307, the motion compensation unit is enbabled. If, however, frame (F) is to be intraframe decoded, then in accordance with step 308, the motion compensation unit is disabled.

In accordance with step 309, a DCT transformation is performed upon the current macroblock ($MB_j$). A quantization value ($Qstep_j$) is then generated for current macroblock ($MB_j$), in accordance with step 310. In accordance with step 312, the tranformed macroblock ($MB_j$) is then quantized based upon the generated quantization value ($Qstep_j$). The quantized transformed macroblock ($MB_j$) is then variable length encoded, in accordance with step 314. In accordance with step 316, the encoded macroblock ($MB_j$) is then reconstructed for the motion compensation unit. Step 318 involves an evaluation as to whether or not the last macroblock $MB_{MBent}$ of selected frame (F) has been encoded. If the last macroblock $MB_{MBent}$ of selected frame (F) has been encoded, then the process begins anew at step 302 for the next frame. If however, the last macroblock $MB_{MBent}$ of selected frame (F) has not been encoded, then in accordance with step 320 the current macroblock count (j) for the selected frame (F) is updated and process is resumed at step 304.

Rate Control Method

Figure 4A:
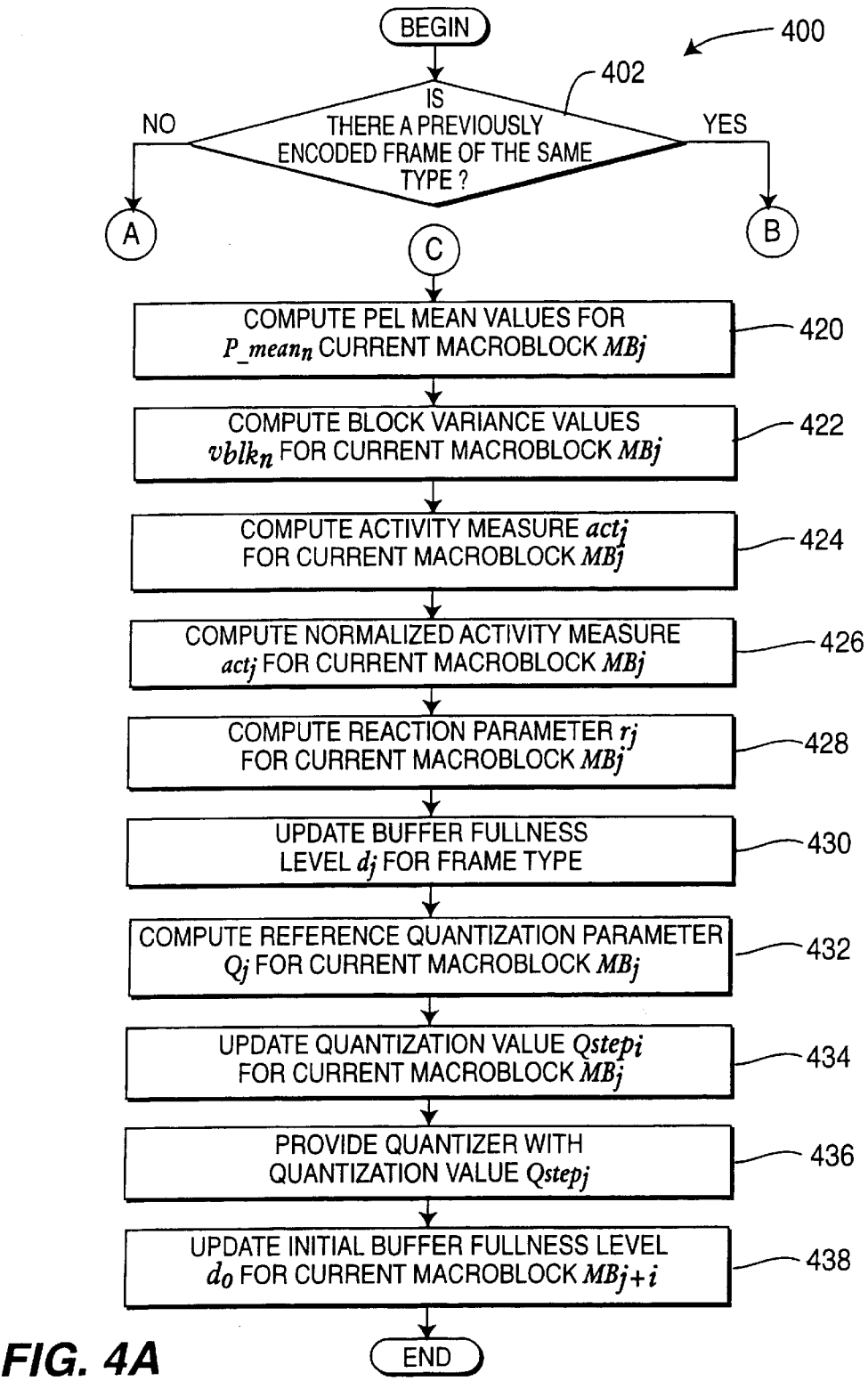
FIGS. 4A–4C show a flowchart of a rate control method used by the video encoder of FIG. 1.
Figure 4B:
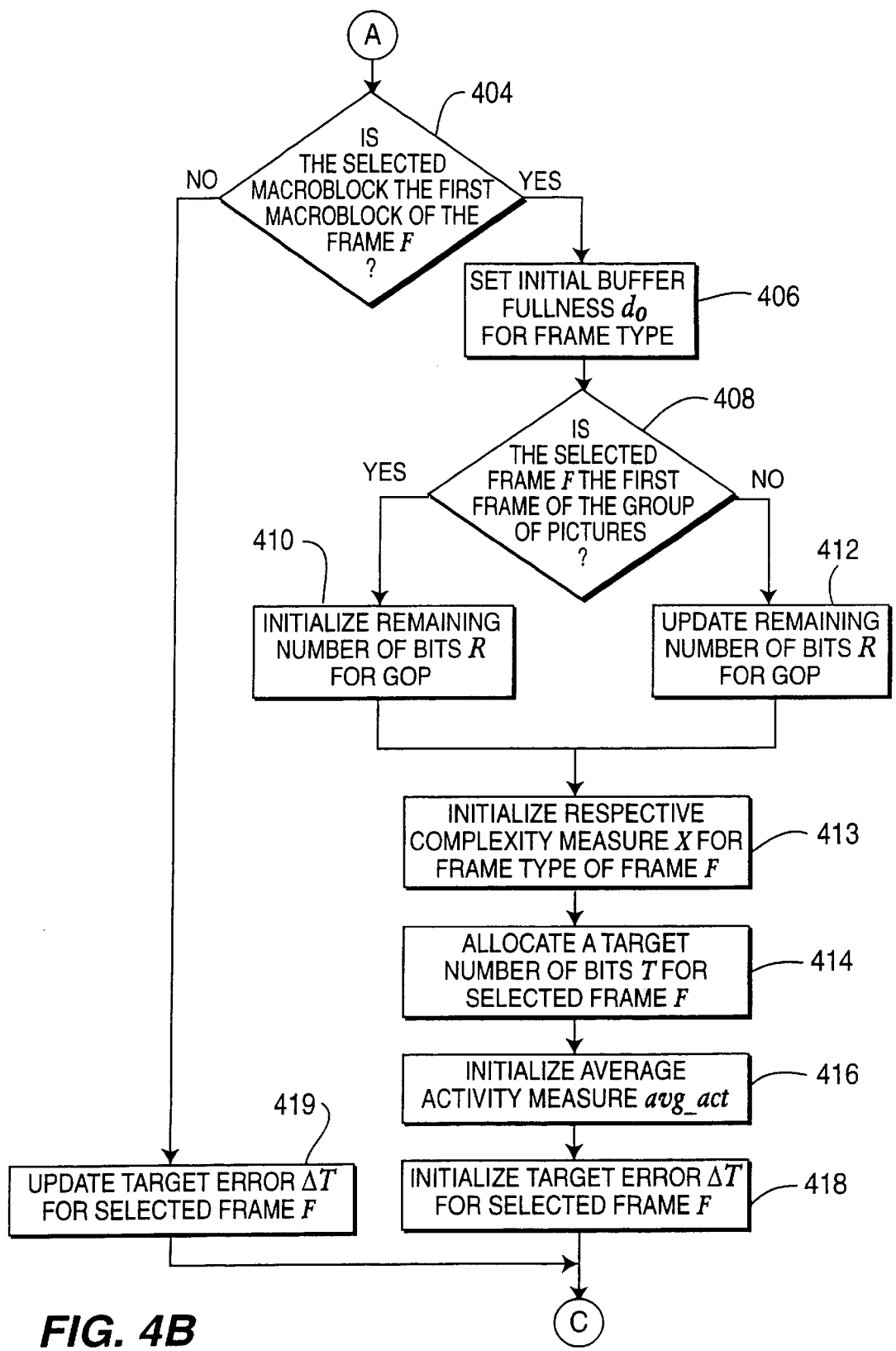
Figure 4C:
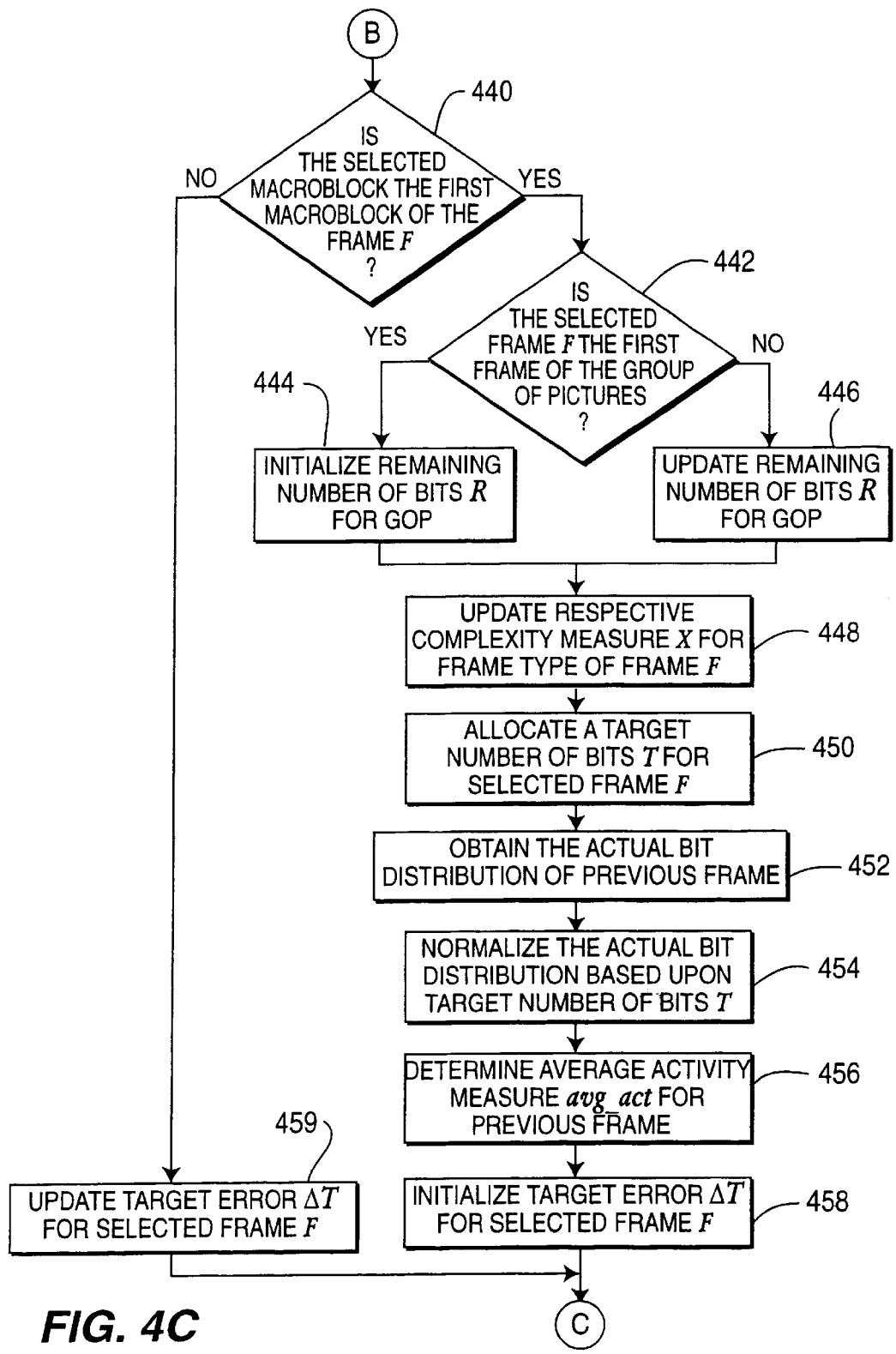

Shown in FIGS. 4A, 4B, and 4C are flowcharts of a rate control method 400 implemented by the rate control processor 119. In general, the rate control method 400 causes the rate control processor 119 to adjust the quantization value $Qstep_j$ of the quantizer 120 in order to maintain the video buffers at a desired fullness level. The rate control processor 119 in implementing the rate control method 400 adjusts the quantization value $Qstep_j$ for each pel macroblock $MB_j$ based upon (i) bit distributions of previously encoded video frames, (ii) complexity of the macroblock being encoded, and (iii) an estimated fullness level of the video buffers.

In step 402, the rate control processor 19 determines whether the video encoder 114 has previously encoded a video frame of the video signal that is of the same frame type as the selected video frame F. If the selected video frame F is an anchor frame (e.g. an I-frame or a P-frame), then the rate control processor 119 determines in step 402 whether the video encoder 114 has previously encoded an anchor frame. Similarly, if the selected frame F is a non-anchor frame (e.g. a B-frame), then the rate control processor 119 in step 402 determines whether the video encoder 114 has previously encoded a non-anchor frame.

If the rate control processor 119 in step 402 determines that the video encoder 114 has not encoded a frame of the same frame type as the selected video frame F, then the rate control processor 119 proceeds to step 404 of FIG. 4B. Conversely, if the rate control processor 119 in step 402 determines that the encoder 114 has encoded a frame of the same frame type as the selected video frame F, then the rate control processor 119 proceeds to step 440 of FIG. 4C.

Referring now to FIG. 4B, the rate control processor 119 in step 404 determines whether the selected pel macroblock $MB_j$ is the first pel macroblock $MB_1$ of the selected frame F. In an exemplary embodiment, processor 119 determines that the selected pel macroblock $MB_j$ is the first pel macroblock $MB_1$ of the selected video frame F if the current macroblock count j for the selected video frame F is equal to 1. If the rate control processor 119 in step 404 determines that the selected pel macroblock $MB_j$ is the first pel macroblock $MB_1$ of the selected video frame F, then processor 119 proceeds to step 406 in order to initialize various parameters. Conversely, if the selected pel macroblock $MB_j$ is not the first pel macroblock $MB_1$ of the selected video frame F, then the rate control processor 119 proceeds to step 419.

The rate control processor 119 in step 406 sets an initial buffer fullness level $d_0^i$, $d_0^p$, and $d_0^b$ for the respective type of video frame encoding being used to encode the selected video frame F. Specifically, in an exemplary embodiment, it sets the respective initial buffer fullness level $d_0^i$, $d_0^p$, and $d_0^b$ based upon the following initialization buffer fullness equations (1), (2), and (3):

$$d_0^i = 10 \times \frac{r}{31} \quad (1)$$

$$d_0^P = K_p \times d_0^i \quad (2)$$

$$d_0^b = K_b \times d_0^i \quad (3)$$

where $K_p$ and $K_b$ are constants that are dependent on the quantization matrices used to quantize pel macroblocks. For example, the constants $K_p$ and $K_b$ are commonly set equal to 1.0 and 1.4, respectively when the quantization matrices defined by the MPEG-2 Test Model 5 are being used.

Moreover, the rate control processor 119 in an exemplary embodiment determines the reaction parameter r of above equation (1) based upon the following reaction parameter initialization equation (4):

$$r = 2 \times \frac{BitRate}{FrameRate} \quad (4)$$

where BitRate is equal to the bit rate (e.g. 4 Megabits per second) at which the video signal is being encoded, and FrameRate is equal to the video frame rate (e.g. 30 video frames per second) at which the video signal is displayed.

After setting the respective initial buffer fullness level $d_0^i$, $d_0^P$, and $d_0^b$, the processor 119 determines (step 408) whether the selected frame F is the first frame of the current GOP $GOP_n$ being encoded. Accordingly, the rate control processor 119, in an exemplary embodiment, determines that the selected video frame F is the first video frame of the current GOP $GOP_n$ based upon whether the video encoder 114 is I-frame encoding the selected frame F. If the video encoder 114 is I-frame encoding the first video frame of the current GOP $GOP_n$, then the rate control processor 119 proceeds to step 410 in order to initialize a remaining number of bits R for the current GOP $GOP_n$. Otherwise, the rate control processor 119 proceeds to step 412 in order to update the remaining number of bits R for the current GOP $GOP_n$.

If encoder 114 is I-frame encoding the first video frame of the current GOP $GOP_n$, the processor 119 in step 410 initializes the remaining number of bits R for the current GOP $GOP_n$. The remaining number of bits R for the current GOP $GOP_n$ is based upon the following GOP allocation initialization equation (5):

$$R = BitRate \times \frac{N}{FrameRate} + R_{Gprev} \quad (5)$$

where N is equal to the total number of frames in the GOP, and $R_{Gprev}$ is equal to the remaining number of bits R of the previously encoded GOP $GOP_{n-}$. If the current GOP $GOP_n$ is the first GOP $GOP_1$, the remaining number of bits $R_{Gprev}$ is equal to zero. Furthermore, if the video encoder 114 used more than the allocated remaining number of bits R to encode the previous GOP $GOP_{n-1}$, the remaining number of bits $R_{Gprev}$ is a negative number. Alternatively, if the video encoder 114 used less than the allocated remaining number of bits R to encode the previous GOP $GOP_{n-1}$, then the remaining number of bits $R_{Gprev}$ is a positive number.

If the video encoder 114 is not encoding the first video frame of the current GOP $GOP_n$, the rate control processor 119 in step 412 updates the remaining number of bits R for the current GOP $GOP_n$. In particular, the rate control process 119 in an exemplary embodiment updates the remaining number of bits R for the current GOP $GOP_n$ based upon the following GOP allocation equation (6):

$$R = R_{prev} - S \quad (6)$$

where $R_{prev}$ is equal to the remaining number of bits for the current GOP $GOP_n$ prior to encoding the selected video frame F, and S is equal to the total number of bits used to encode the previous video frame of the current GOP $GOP_n$.

After either initializing or updating the remaining number of bits R for the GOP, the processor 119 initializes in step 413 a respective complexity measure $X_i$, $X_p$, or $X_b$ for the particular type of video frame encoding being used to encode the selected video frame F. The respective complexity measure $X_i$, $X_p$, and $X_b$ can be based upon one the following complexity initialization equations (7), (8), and (9):

$$X_i = \frac{160 \times BitRate}{115} \quad (7)$$

$$X_p = \frac{60 \times BitRate}{115} \quad (8)$$

$$X_b = \frac{42 \times BitRate}{115} \quad (9)$$

At step 414, the processor 119 allocates a target number of bits $T_i$, $T_p$, or $T_b$ to the selected video frame F. The respective target number of bit $T_i$, $T_p$, or $T_b$ may be based upon the following video frame allocation equations (10), (11), and (12):

$$T_i = \max\left\{\frac{R}{1 + \frac{N_p X_p}{X_i K_p} + \frac{N_b X_b}{X_i K_b}}, \frac{BitRate}{8 \times FrameRate}\right\} \quad (10)$$

$$T_p = \max\left\{\frac{R}{N_p + \frac{N_b K_p X_b}{K_b X_p}}, \frac{BitRate}{8 \times FrameRate}\right\} \quad (11)$$

$$T_b = \max\left\{\frac{R}{N_b + \frac{N_p K_b X_p}{K_p X_b}}, \frac{BitRate}{8 \times FrameRate}\right\} \quad (12)$$

where $T_i$, $T_p$, $T_b$ correspond to I, P and B targets respectively. In equations (10), (11), and (12), $N_p$ is the number of P-frames of the current GOP $GOP_n$ that have yet to be encoded, and $N_b$ is the number of B-frames of the current GOP $GOP_n$ that have yet to be encoded. For example, just prior to encoding P-frame $P_6$ of the first GOP $GOP_1$, the number of remaining P-frames $N_p$ is equal to 2, and the number of remaining B-frames $N_b$ is equal to 4. (See, FIG. 2.)

The rate control processor 119 then in step 416 initializes an average activity measure avg_act, for example 400.

If the processor 119 determined (step 404) that the current pel macroblock $MB_j$ to be encoded is the first pel macroblock $MB_1$ of the selected frame F, then the processor 119 initializes (step 418) a target error value $\Delta T_j$ for the selected frame F. More specifically, in an exemplary embodiment, it sets the target error value $\Delta T_j$ equal to zero in order to initialize the target error value $\Delta T_j$ for the selected video frame F.

However, if the current pel macroblock $MB_j$ to be encoded is not the first pel macroblock $MB_1$ of the selected video frame F, then the rate control processor updates, in step 419, the target error value $\Delta T_j$ for the selected video frame F. More specifically, the rate control processor 119 determines the difference between the total number of bits $B_{j-1}$ currently used to encode the selected video frame F and a linear estimate of the number of bits to encode the selected video frame F that is based upon the respective target number of bits $T_j$, $T_p$, or $T_b$ for the selected video frame F. For example, the rate control processor 119 determines the target error value $\Delta T_j$ based upon the following target error equation (13):

$$\Delta T_j = B_{j-1} - \left(\frac{T \times (j-1)}{MBCnt}\right) \quad (13)$$

where $B_{j-1}$ represents the total number of bits used to encode the pel macroblocks of the selected video frame F up to but not include the current pel macroblock $MB_j$, MBcnt represents the total number of macroblocks of the selected video frame F, j represents the current macroblock count, and T represents the target number of bits $T_j$, $T_p$, or $T_b$ allocated to the selected video frame F.

In step 420, the processor 119 computes two pel mean values $Pmean_n$ for each luminance sub-block of the pel macroblock $MB_j$. In particular, the rate control processor 119 calculates for each pel luminance sub-block of the a pel macroblock $MB_j$, a pel mean value $Pmean_n$ (n=1, 2, 3, and 4) based upon a frame organization of the pels of the macroblock $MB_j$. Moreover, the processor 119 calculates for each pel luminance sub-block of the pel macroblock $MB_j$, a pel mean value $Pmean_n$ (n=5, 6, 7, and 8) based upon a field organization of the pels of the macroblock $MB_j$. Specifically, the rate control processor 119 in an exemplary embodiment computes the pel mean values $Pmean_1$, $Pmean_2$, ... $Pmean_8$ based upon the following pel mean equation (14):

$$Pmean_n \big|_{n=1}^{8} = \frac{1}{64} \times \sum_{1}^{64} P_k^n \bigg|_{n=1}^{8} \quad (14)$$

where $P_k^n$ represent the $k^{th}$ pel value of the $n^{th}$ sub-block of the field or frame organized pel macroblock $MB_j$.

After computing the pel mean values $Pmean_1$, $Pmean_2$, ... $Pmean_8$, the processor 119 in step 422 computes two block variance values $vblk_n$ for each of pel luminance sub-blocks of the current pel macroblock $MB_j$, one block variance value $vblk_n$ (n=1, 2, 3, and 4) based upon a frame organization of the pels of the macroblock $MB_j$, and a second block variance value $vblk_n$ (n=5, 6, 7, and 8) based upon a field organization. The rate control processor 119 obtains the block variance values $vblk_1$, $vblk_2$, ... $vblk_8$ based upon the following block variance equation (15):

$$vblk_n \big|_{n=1}^{8} = \frac{1}{64} \times \sum_{1}^{64} (P_k^n - Pmean_n)^2 \bigg|_{n=1}^{8} \quad (15)$$

The processor 119 computes (step 424) an activity measure $act_j$ for the current pel macroblock $MB_j$ based upon the block variance values $vblk_1$, $vblk_2$, ... $vblk_8$. An exemplary computation of the activity measure $act_j$ for the current pel macroblock $MB_j$ is given by equation (16):

$$act_j = 1 + \min(vblk_1, vblk_2, \ldots, vblk_8) \quad (16)$$

where the min( ) function obtains the smallest block variance $vblk_n$ of the current pel macroblock $MB_j$.

After obtaining the activity measure $act_j$, the processor 119 normalizes the activity measure $act_j$ in step 426. More specifically, an exemplary control processor 119 computes a normalized activity measure $N\_act_j$ for the current pel macroblock $MB_j$ based upon equation (17):

$$N\_act_j = \frac{(2 \times act_j) + avg\_act}{act_j + (2 \times avg\_act)} \quad (17)$$

The rate control processor 119 then in step 428 modulates a reaction parameter $r_j$ based upon the normalized activity measure $N\_act_j$ for the current pel macroblock $MB_j$. Processor 119, in general, generates a larger reaction parameter $r_j$ for more complex pel macroblocks and a smaller reaction parameter $r_j$ for less complex pel macroblocks when the target error $\Delta T_j$ indicates that more bits have actually been used to encode the selected frame F up to the current pel macroblock $MB_j$ than have been estimated. The reaction parameter $r_j$ is modulated based upon the following reaction parameter equation (18):

$$r_j = 2 \times \left(1 - \frac{\Delta T_j \times MBcnt}{j \times T \times (N\_act_j)^2}\right) \times \frac{BitRate}{FrameRate} \quad (18)$$

where T represents the respective target number of bits $T_i$, $T_p$, or $T_b$ for the selected video frame F, and $\Delta T_j$ represents the target error value for the current pel macroblock $MB_j$. Modulating the reaction parameter $r_j$ in the above manner, results in stronger quantization being performed on less complex macroblocks than on more complex macroblocks. By quantizing less complex macroblocks more strongly than complex macroblocks when more bits have been used than estimated, the video encoder 114 is generally able to obtain better image quality than prior video encoders.

At step 430, the rate control processor 119 updates a buffer fullness level $d_j^i$, $d_j^p$, and $d_j^b$ for the respective type of video frame encoding being used to encode the selected frame F. The respective buffer fullness level $d_j^i$, $d_j^p$, or $d_j^b$ may be based upon the respective following buffer fullness equations (19), (20), and (21):

$$d_j^i = d_0^i + \Delta T_j \quad (19)$$

$$d_j^p = d_0^p + \Delta T_j \quad (20)$$

$$d_j^b = d_0^b + \Delta T_j \quad (21)$$

where $d_0^i$, $d_0^p$, or $d_0^b$ represent the buffer fullness level of the respective target buffer prior to encoding the current pel macroblock $MB_j$, and $\Delta T_j$ represents the target error value for the current pel macroblock $MB_j$.

After updating the buffer fullness levels $d_j^i$, $d_j^p$, and $d_j^b$, the rate control processor 119 in step 432 computes a reference quantization parameter $Q_j$ for the current pel macroblock $MB_j$ to be encoded. The rate processor 119 computes reference quantization parameters $Q_j$ based upon the following reference quantization equation (22):

$$Q_j = \frac{d_j \times 31}{r_j} \quad (22)$$

where $r_j$ represents the reaction parameter for the current pel macroblock $MB_j$ and $d_j$ represents the buffer fullness level $d_j^i$, $d_j^p$, or $d_j^b$ for the respective type of video frame encoding being used to encode the selected video frame F.

In step 434, the rate control processor 119 computes a quantization value $Qstep_j$ for the pel macroblock $MB_j$ based upon the following equation (23):

$$Qstep_j = Q_j \times N\_act_j \quad (23)$$

where $N\_act_j$ represents the normalized activity measure for the current pel macroblock $MB_j$. Moreover, the rate control processor 119 constrains the quantization value $Qstep_j$ to the range of integers between and including 1 and 31.

The rate control processor 119 then in step 436 provides the quantizer 120 with the obtained quantization value $Qstep_j$ in order to cause the quantizer 120 to quantize the current pel macroblock $MB_j$ based upon the obtained quantization value $Qstep_j$.

The rate control processor 119 then in step 438 updates the respective initial buffer fullness level $d_0^i$, $d_0^P$, or $d_0^b$ for the next pel macroblock of the respective type of video frame encoding being used to encode the selected video frame F. In particular, the rate control processor 119 in an exemplary embodiment sets the initial buffer fullness level $d_0^i$, $d_0^P$, or $d_0^b$ for the next pel macroblock equal to the respective buffer fullness level $d_j^i$, $d_j^P$, or $d_j^b$ for the current pel macroblock $MB_j$.

After providing the quantizer 120 with an appropriate quantization value $Qstep_j$ and updating the respective initial buffer fullness level, the rate control processor 119 stops executing the rate control method 400 until the next pel macroblock is encoded.

Referring now to FIG. 4C, if the rate control processor 119 in step 402 determines that a frame has been encoded using the same type of frame encoding as the video encoder 114 is using to encode the selected frame F, then the rate control processor 119 in step 440 determines whether the selected pel macroblock $MB_j$ is the first pel macroblock $MB_1$ of the selected frame F. It does this in the same manner as in step 404. More specifically, in an exemplary embodiment it determines that the selected pel macroblock $MB_j$ is the first pel macroblock $MB_1$ if the current macroblock count j for the selected video frame F is equal 1. If it is the first pel macroblock $MB_1$ of the selected frame F, then the rate control processor 119 proceeds to step 442; otherwise, the rate control processor 119 proceeds to step 459.

In step 442, the rate control processor 119 determines whether the selected video frame F is the first video frame of the current GOP $GOP_n$ being encoded. If the selected video frame F is the first video frame of the current GOP $GOP_n$, then the rate control processor 119 proceeds to step 444 in order to initialize a remaining number of bits R for the current GOP $GOP_n$. Otherwise, the processor 119 proceeds to step 446 in order to update the remaining number of bits R for the current GOP $GOP_n$.

After determining that the video encoder 114 is encoding the first video frame of the current GOP $GOP_n$, the rate control processor 119 in step 444 initializes the remaining number of bits R for the current GOP $GOP_n$. Specifically, the video encoder 114, in an exemplary embodiment, initializes the remaining number of bits R for the current GOP $GOP_n$ based upon the above GOP allocation initialization equation (5).

However, if video encoder 114 is not encoding the first frame of the current GOP $GOP_n$, then the processor 119, in step 446, updates the remaining number of bits R for the current GOP $GOP_n$, where R is determined according to equation (6).

After either initializing or updating the remaining number of bits R for the current GOP $GOP_n$, the processor 119 updates, in step 448, a respective complexity measure $X_i$, $X_p$, or $X_b$ for the particular type of video frame encoding being used to encode the selected video frame F. The respective complexity measures $X_i$, $X_p$, and $X_b$ are based upon one the following video frame complexity equations (24), (25), and (26):

$$X_i = S_i Q_i, \quad (24)$$

$$X_p = S_p Q_p, \quad (25)$$

$$X_b = S_b Q_b, \quad (26)$$

where $S_i$, $S_p$ and $S_b$ represent the number of bits generated in order to encode the previous I-frame, or P frame or B frame respectively. Moreover, in (24), (25), and (26), $Q_i$ represents the average quantization parameter for the previous I-frame which is computed by averaging the actual quantization values used to encode the previous I-frame, $Q_p$ represents the average quantization parameter for the previous P-frame which is computed by averaging the actual quantization values used to encode the previous P-frame including the skipped macroblocks, and $Q_b$ represents the average quantization parameter for the previous B-frame which is computed by averaging the actual quantization values used to encode the previous B-frame including the skipped macroblocks.

Then in step 450, the processor 119 allocates a target number of bits $T_i$, $T_p$, or $T_b$ to the selected video frame F. More specifically, the rate control processor 119 allocates the respective target number of bit $T_i$, $T_p$, or $T_b$ based upon the above video frame allocation equations (10), (11), and (12).

Then, the rate control processor 119 obtains in step 452 an actual bit distribution for a previously encoded video frame of the same frame type (e.g. anchor, non-anchor) as the selected video frame F. The rate control processor 119 analyzes the previously encoded video frame of the same frame type to obtain the actual number of bits $AB_x$ used to encode each pel macroblock $MB_x$ of the video frame.

After obtaining the actual bit distribution for the previously encoded video frame, the processor 119, in step 454, adjusts the actual bit distribution to obtain a normalized bit distribution which represents the same number of bits as the target number of bits ($T_i$, $T_p$, or $T_b$) for the selected frame F. The normalized bit distribution comprising normalized actual number of bits $NAB_x$ may be based upon the following normalization equations (27):

$$NAB_k \big|_{k=1}^{MBcnt} = AB_k \times \frac{T}{S} \bigg|_{k=1}^{MBcnt} \quad (27)$$

where S represents the total number of bits $S_a$, or $S_n$ used to encode the previous anchor or non-anchor video frame of the video signal, and T represents the target number of bits $T_i$, $T_p$, $T_b$ for the selected video frame F.

The processor 119, then in step 456, updates the average activity measure avg_act based upon the previously encoded video frame. In particular, I processor 119 calculates the average activity measure avg_act based upon the following average activity equation (28):

$$\text{avg\_act} = \frac{1}{MBcnt_{prev}} \sum_{k=1}^{MBcnt_{prev}} act_k^{prev} \quad (28)$$

where $MBcnt_{prev}$ represents the number of macroblocks included in the previously encoded video frame, and each of $act_1^{prev}$, $act_2^{prev}$, ... $act_{MB\_cnt_{prev}}^{prev}$ represents a spatial activity measure of a respective macroblock $MB_1^{prev}$, $MB_2^{prev}$, ... $MB_{MB\_cnt_{prev}}^{prev}$ of the previously encoded video frame.

If the processor 119 determined, in step 440, that the current pel macroblock $MB_j$ is the first pel macroblock $MB_1$ of the selected frame F, then the processor 119 in step 458 initializes a target error value $\Delta T_j$ for the selected frame F. More specifically, the target error value $\Delta T_j$ is set equal to zero.

However, if the current pel macroblock $MB_j$ is not the first pel macroblock $MB_1$ of the selected frame F, then the processor 119, in step 459, updates the target error value $\Delta T_j$ for the selected frame F. More specifically, the rate control processor 119 updates the target error value $\Delta T_j$ by determining the difference between the total number of bits $B_{j-1}$ currently used to encode the selected video frame F and a non-linear estimate that is based upon the normalized actual bit distribution obtained in step 454. In an exemplary embodiment, target error value $\Delta T_j$ is determined based upon the following target error equation (29):

$$\Delta T_j = B_{j-1} - \sum_{k=1}^{j-1} NAB_k \qquad (29)$$

where $B_{j-1}$ represents the total number of bits used to encode the pel macroblocks of the selected frame F up to but not including the current pel macroblock $MB_j$, j represents the current macroblock count, and each $NAB_x$ represents a normalized actual number of bits of the normalized actual bit distribution.

After obtaining the target error value $\Delta T_j$ for the current pel macroblock $MB_j$, the rate control processor proceeds to step 420 to obtain the quantization value $Qstep_j$ for the pel macroblock $MB_j$. More specifically, due to the target error value $\Delta T_j$ being based upon the normalized actual distribution of a previously encoded video frame of the same frame type as the selected frame F, the processor 119 by returning to step 420 of the rate control method 400 obtains a reaction parameter $r_j$ and a quantization value $Qstep_j$ that are based upon the actual bit distribution of the previously encoded frame.

Several of the above steps and/or corresponding calculations may be combined. For example, the rate control processor 119, prior to quantizing pel macroblock $MB_j$ updates the respective buffer fullness level $d_j^i$, $d_j^p$, or $d_j^b$ for the type of video frame encoding being used on the selected frame F based upon the following equations:

$$d_j^i = d_0^i + B_{j-1} - Anchor_{-1}(j-1) \qquad (30)$$

$$d_j^p = d_0^p + B_{j-1} - Anchor_{-1}(j-1) \qquad (31)$$

$$d_j^b = d_0^b + B_{j-1} - NonAnchor_{-1}(j-1) \qquad (32)$$

$$Anchor(j) = \begin{cases} \dfrac{j \times T}{MBcnt} & \text{for first anchor frame} \\ \dfrac{Anchor_{-1}(j) \times T}{Anchor_{-1}(MBcnt)} & \text{for subsequent anchor frames} \end{cases} \qquad (33)$$

$$NonAnchor(j) = \qquad (34)$$
$$\begin{cases} \dfrac{j \times T}{MBcnt} & \text{for first non-anchor frame} \\ \dfrac{NonAnchor_{-1}(j) \times T}{NonAnchor_{-1}(MBcnt)} & \text{for subsequent nonanchor frames} \end{cases}$$

where $B_{j-1}$ represents the actual number of bits used to encode up to the current macroblock $MB_j$, $Anchor_{-1}(j)$ represents the total number of bits used to encode the previous anchor frame up to the macroblock $MB_j$, $Anchor_{-1}(MBcnt)$ represents the total number of bits used to encode the previous anchor frame, $NonAnchor_{-1}(j)$ represents the total number of bits used to encode the previous non-anchor frame up to the macroblock $MB_j$, $NonAnchor_{-1}(MBcnt)$ represents the total number of bits used to encode the previous non-anchor frame, and $d_0^i$, $d_0^p$, and $d_0^b$ represent the current levels of the respective buffer fullness levels $d_j^i$, $d_j^p$, and $d_j^b$.

Splice Points

Figure 5:
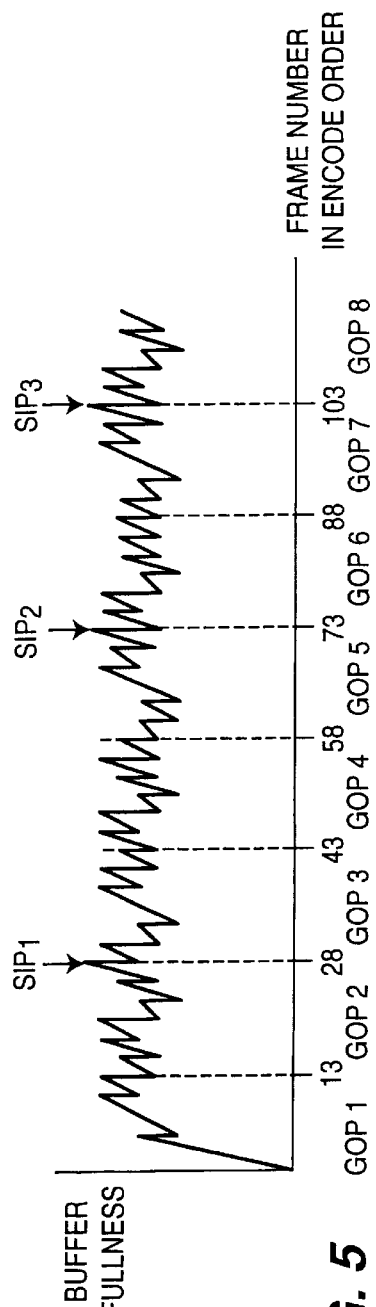
FIG. 5 graphically illustrates fullness of a buffer receiving a compressed video stream generated by the video encoder of FIG. 1.

The Society of Motion Picture and Television Engineers (SMPTE) has proposed standard 312M which defines various constraints for splicing MPEG bit streams. In general, splicing of MPEG bit streams requires managing buffer fullness of the video buffers. When MPEG bit streams are encoded, there is an inherent buffer occupancy at every point in time as illustrated in FIG. 5. Moreover, the buffer fullness corresponds to a delay representative of the amount of time that a byte spends in the buffer. When splicing two separately encoded bit streams, the delay at the splice point will not usually match. This mismatch in delay can cause the video buffer of the video decoder to overflow or underflow.

To avoid unpredictable underflows and overflows, two splicing techniques have been defined. The seamless splicing method requires the MPEG encoder match the delay at splicing points to a given value. The nonseamless method does not require the encoder to match the delay. Instead, the splicing device is responsible for matching the delay of the new material and the old material as well as it can. In some cases, this will result in a controlled decoder buffer underflow. This underflow can be masked in the decoder by holding the last video frame of the outgoing video and muting the audio until the first access unit of the new stream has been decoded. Both splicing methods may cause an underflow of the audio buffer at the receiver.

The term "seamless" as used herein means or relates to a splicing method that employs substantial matching of delay at a splice point.

To enable the splicing of compressed bit streams, the SMPTE 312M standard defines constraints for splice points in an MPEG transport stream. Splice points in an MPEG transport stream provide opportunities to switch from one program to another. In general splice points indicate a safe place to switch between compressed bit streams. In other words, splice points indicate a place in a bit stream where a switch can be made and result in relatively good visual and audio quality.

Moreover, the SMPTE 312M standard defines two types of splice points for compressed bit streams, out points and in points. In points are locations in the bit stream where it is safe to enter and start decoding the bit stream. Out points are places where it is safe to exit the bit stream. The SPMTE 312M standard also defines techniques for grouping in points of individual compressed bit streams in order to enable switching to a program having multiple compressed bit streams. Similarly, the SPMTE 312 standard also define techniques for grouping out points of individual compressed bit streams into program out points in order to enable exiting a program having multiple compressed bit streams.

Splice in Point Encoding

Two constraints defined by the SMPTE 312M standard for a seamless video in point is that (i) the first coded video frame be an I-frame, and (ii) the time between when the first byte after the in point enters the video buffer verifier (VBV) buffer (i.e. a virtual buffer used to estimate fullness of the video decoder's video input buffer) and the time when that byte is removed from the VBV buffer be equal to the appropriate splice point decoding delay SpliceDecodingDelay defined by the SMPTE 312M standard. The decoding delay SpliceDecodingDelay definition is based upon the Profile@Level and application (e.g. ATSC transmission, HDTV studio) of the encoded bit stream. For example, the SMPTE 312M standard currently defines the splice point decoding delay SpliceDecodingDelay for an ATSC transmission of an MP@HL bit stream to be 250 milliseconds.

The splice point decoding delay SpliceDecodingDelay for a particular video frame is directly related to the buffer fullness level. To realize the requisite buffer fullness level at the splice in point, the video encoder 114 must have tight control over the number of bits used to encode the video frames prior to the splice in point. The video encoder 114 utilizes a slightly modified version of the rate control method 400 to achieve the SMPTE 312M defined splice point decoding delay for each seamless video in point. In particular, the rate control processor 119 determines a target correction factor TargetCorrection$_n$ for the GOP GOP$_n$, and allocates a remaining number of bits R to the current GOP GOP$_n$ based upon the target correction factor.

Figures 6, 7:
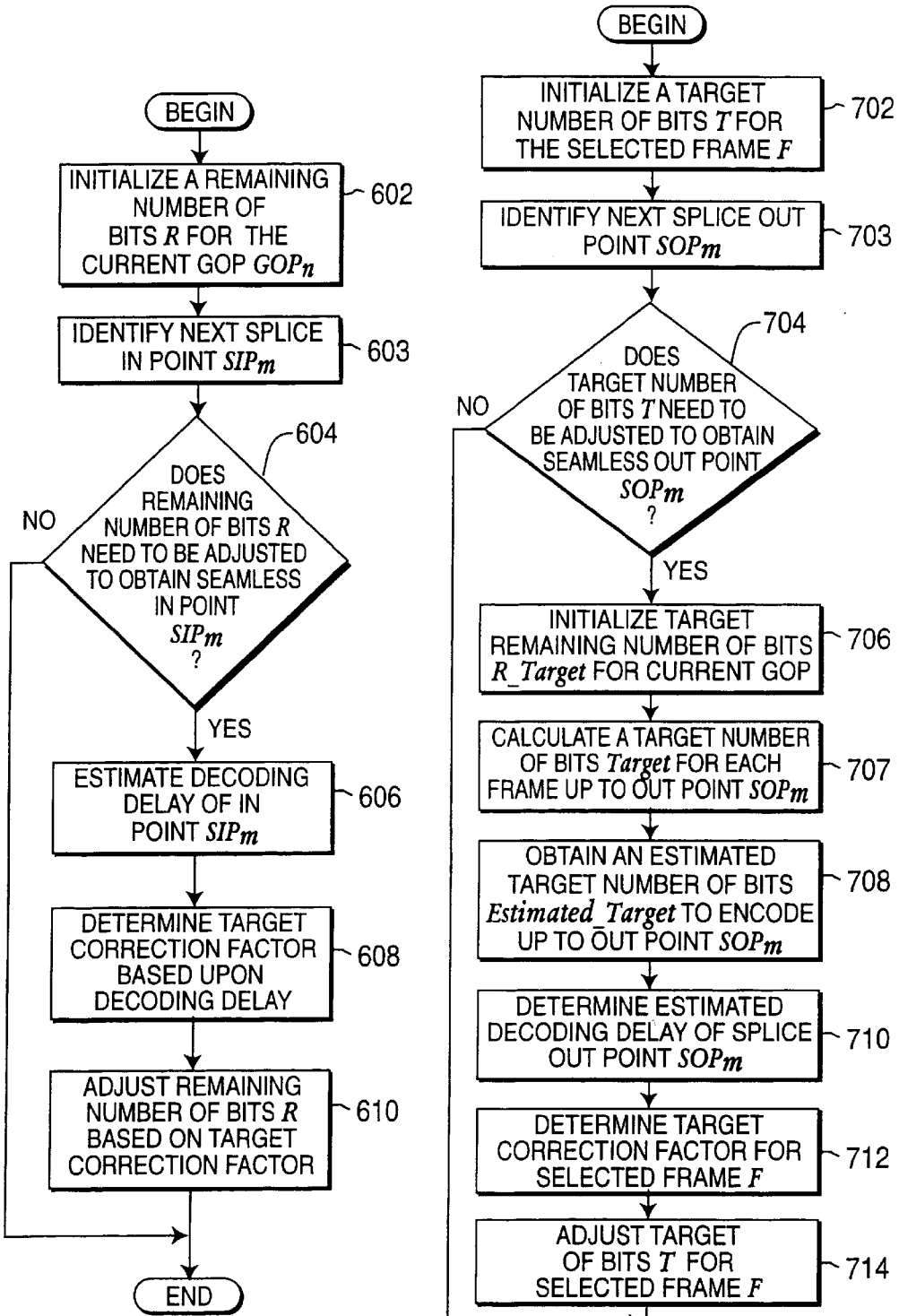
FIG. 6 shows a flowchart of an in point GOP allocation method used by the video encoder of FIG. 1 to obtain seamless splice in points.
FIG. 7 shows a flowchart of an out point frame allocation method used by the video encoder of FIG. 1 to obtain seamless splice out points.

Referring now to FIG. 6, there is depicted an in point GOP allocation method which initializes the remaining number of bits R for a GOP or a group of GOPs that precede a desired splice in point SIP$_m$ based upon a target correction factor TargetCorrection$_x$ for each preceding GOP GOP$_x$. More specifically, the above steps 410 and 444 of the rate control method 400 which initialize the remaining number of bits R are replaced with the in point GOP allocation method. The GOP allocation method begins in step 602 with the rate control processor 119 initializing a remaining number of bits R for the current GOP GOP$_n$. The remaining number of bits R for the current GOP GOP$_n$ are based upon the above GOP allocation equation (5).

The rate control processor 119, in step 603, then identifies the next desired splice in point SIP$_m$. The processor 119 receives splice in point configuration information from a user that identifies desired loctions in the encoded video stream for seamless splice in points. For example, the splice in point configuration information may indicate that splice in points should be placed at 1 minute intervals with several additional splice in points temporally concentrated about typical commercial break points of a television program.

After identifying the next desired splice in point SIP$_m$, the rate control processor in step 604 determines whether the remaining number of bits R for the current GOP should be adjusted in order to achieve a required decoding delay at the splice in point SIP$_m$. More specifically, the rate control processor 119 in step 604 determines whether the current GOP GOP$_n$ precedes the desired splice in point SIP$_m$ and whether the current GOP GOP$_n$ contains a splice in point SIP$_x$.

It should be appreciated that except for the GOPs following the last splice in point SIP$_{Last}$ of a bit stream, each GOP GOP$_x$ of the bit stream precedes at least one splice in point of the bit stream. Accordingly, in order to limit the number of GOPs affected by the target correction factor TargetCorrection$_n$, the rate control processor 119 utilizes a user definable GOP limit which limits the determination to a specific number of GOPs preceding the desired splice in point SIP$_m$. For example, if the user definable GOP limit is set to a value of three, then the rate control processor 119 would limit the determination to GOPs within three GOPs of the desired splice in point SIP$_m$. Accordingly, if a desired splice in point SIP$_m$ were not within three GOPs of the current GOP GOP$_n$, then the rate control processor 119 in the exemplary embodiment would determine that the remaining number of bits R for the current GOP GOP$_n$ need not be adjusted.

If the remaining number of bits R for the current GOP GOP$_n$ does not need adjusting, the processor 119 exits the GOP allocation method and returns to the rate control method 400 of FIGS. 4A–4C. If the remaining number of bits R does not need adjusting, the rate control processor 119 in executing the GOP allocation method essentially allocates the same remaining number of bits R to the current GOP GOP$_n$ as steps 414 and 444 of the method 400.

If the processor 119 in step 604 determines that the remaining number of bits R does need adjusting, the processor 119 proceeds to step 606 in order to estimate the in point decoding delay DecodingDelay$_{IP}$ for the desired splice in point SIP$_m$. The estimation of decoding delay DecodingDelay$_{IP}$ for the desired splice in point SIP$_m$ is based upon the following in point decoding delay equation (35):

$$DecodingDelay_{IP} = DecodingDelay_1 + \qquad (35)$$

$$\frac{SIPFrame\#}{FrameRate} - \frac{R_{Gprev} + (SIPFrame\# - CurrentFrame\#) \times \frac{BitRate}{FrameRate} + BitCount}{BitRate}$$

where DecodingDelay$_1$ represents the decoding delay of the first video frame of the video stream, SIPframe# represents the encode/decode video frame number of the splice in point SIP$_m$, CurrentFrame# represents the encode/decode video frame number of the selected video frame F, R$_{Gprev}$ represents the number of bits R allocated to the previous GOP GOP$_{n-1}$ that are still remaining after encoding the previous GOP GOP$_{n-1}$, and BitCount represents the total number of bits used to encode the video stream up to the current GOP GOP$_n$.

After obtaining the estimated decoding delay DecodingDelay$_{IP}$ for the splice in point SIP$_m$, the rate control processor 119 in step 608 obtains a target correction factor TargetCorrect$_n$ for the current GOP GOP$_n$. The target correction factor TargetCorrection$_n$ for the current GOP GOP$_n$ is determined according to the following target correction factor equation (36):

$$TargetCorrection_n = \qquad (36)$$

$$\frac{(DecodingDelay_{IP} - (SpliceDcodingDelay + B)) \times BitRate}{RemGOPs}$$

where B is a calibration constant which attempts to ensure that the resulting decoding delay DecodingDelay$_{IP}$ for the SIP$_m$ is greater than the required splice point decoding delay SpliceDecodingDelay. In this manner, video stream decoder 114 may later insert stuffing bits in order to achieve the required splice point decoding delay SpliceDecodingDelay.

Moreover, RemGOPs in above equation (36) represents the remaining number of GOPs to be encoded before the splice in point SIP$_m$. For example, in determining the target correction factor TargetCorrection$_n$ for the third GOP GOP$_3$ of FIG. 5, the remaining number of GOPs RemGOPs before the second splice in point SIP$_2$ would be equal to three since the rate control processor 119 may adjust the remaining number of bits R for each of the GOPs GOP$_3$ GOP$_4$ and GOP$_5$ in order to achieve the required splice point decoding delay SpliceDecodingDelay at the second splice in point SIP$_2$. Similarly, in determining the target correction factor TargetCorrection$_n$ for the fourth GOP GOP$_4$ of FIG. 5, the remaining number of GOPs RemGOPs before the second splice in point SIP$_2$ would be equal to two since the rate control processor 119 may now only adjust the remaining number of bits R for each of the GOPs GOP$_4$ and GOP$_5$ in order to achieve the required splice point decoding delay SpliceDecodingDelay at the second splice in point $SIP_2$.

The rate control processor 119 then in step 610 adjusts the remaining number of bits R for the current GOP $GOP_n$ based upon the obtained target correction factor $TargetCorrection_n$. More specifically, the rate control processor 119 in an exemplary embodiment adjusts the remaining number of bits R based upon the following GOP adjustment equation (37):

$$R = R_0 + TargetCorrection_n - TargetCorrection_{n-1} \quad (37)$$

where $R_0$ represents the remaining number of bits originally allocated to the current GOP $GOP_n$ in step 602, and $TargetCorrection_{n-1}$ represents the target correction factor used with the previous GOP $GOP_{n-1}$ of the video signal. The target correction factor $TargetCorrection_{n-1}$ in an exemplary embodiment is set equal to zero if the current GOP $GOP_n$ is the first GOP $GOP_1$ of the video signal. Moreover, it should be appreciated that the previous target correction factor $TargetCorrection_{n-1}$ is subtracted from the remaining number of bits R for the current GOP $GOP_n$ in order to maintain the constant bit rate encoding properties of the video encoder 114.

After obtaining the adjusted remaining number of bits R for the current GOP $GOP_n$, the rate control processor 119 exits the in point GOP allocation method. Moreover, the rate control processor 119 returns to the rate control method 400 to obtain a quantization value $Qstep_j$ for the current pel macroblock $MB_j$ based upon the adjusted remaining number of bits R for the current GOP $GOP_n$.

After encoding the video frame preceding the splice in point $SIP_m$, the rate control processor 119 determines the in point decoding delay $DecodingDelay_{IP}$ for the splice in point $SIP_m$ and adjusts the encoded bit stream in order to achieve the required splice point decoding delay SpliceDecodingDelay at the splice in point $SIP_m$. The in point decoding delay $DecodingDelay_{IP}$ for the splice in point $SIP_m$ is determined according to the following in point delay equation (38):

$$DecodingDelay_{IP} = DecodingDelay_1 + \frac{SIPFrame\#}{FrameRate} - \frac{BitCount}{BitRate} \quad (38)$$

where BitCount represents the total number of bits used to encode the video stream up to the splice in point $SIP_m$.

If the in point decoding delay $DecodingDelay_{IP}$ is greater than the required splice point decoding delay SpliceDecodingDelay, then the video encoder 114 adds stuffing bits to the encoded video stream. The number of stuffing bits to add to the encoded video stream is calculated according to the following bit stuffing equation (39):

$$NumStuffingBits = (DecodingDelay_{IP} - SpliceDecodingDelay) \times BitRate \quad (39)$$

where NumStuffingBits represents the number of stuffing bits required in order to achieve the required splice point delay SpliceDecodingDelay for the splice in point $SIP_m$ to be a seamless in point.

The MPEG standard limits the number of stuffing bits which may be added. If the required splice point delay SpliceDecodingDelay cannot be achieved with stuffing bits, the video encoder 114 marks the splice in point $SIP_m$ as a non-seamless splice in point.

Splice Out Point Encoding

Two constraints defined by the SMPTE 312M standard for a seamless video out point are that (i) the last video frame (in presentation order) preceding a splice out point shall be either a P-frame or an I-frame, and (ii) the last payload byte of the out point packet shall remain in the VBV buffer an amount of time equal to the appropriate splice point decoding delay SpliceDecodingDelay minus the display duration of the last video frame of the old material. As shown in FIG. 2, presentation order is not the same as encode/decode order when the video stream includes B-frames. Consequently, the last payload byte of the output packet is not necessarily a byte of the last video frame preceding a splice out point in presentation order.

For example, the P-frame $P_6$ of FIG. 2 is the last video frame in presentation order before the second splice out point $SOP_2$. However, the B-frames $B_4$ and $B_5$, which precede the P-frame $P_6$ in presentation order, follow the P-frame $P_6$ in decode/encode order. The last payload byte of the out point packet containing the second splice out point $SOP_2$ corresponds with the B-frame $B_5$. Therefore, in order to satisfy the above second constraint for an out point at the P-frame $P_6$, the decoding delay DecodingDelay(Last Byte of $B_5$) for the last byte of the B-frame $B_5$ must be equal to the splice point decoding delay SpliceDecodingDelay minus the display duration of the last video frame Display_period_last_AU preceding the splice out point $SOP_2$ (i.e. display duration of the P-frame $P_6$). Therefore, the decoding delay DecodingDelay($P_9$) for the P-frame $P_9$ following the second splice out point $SOP_2$ must be equal to the decoding delay DecodingDelay(Last Byte of $B_5$) of the last byte of the B-frame $B_5$ plus the display duration of the last video frame Display_period_last_AU preceding the splice out point $SOP_2$.

Combining the above two equalities, the decoding delay DecodingDelay($P_9$) of the P-frame $P_9$, which is the next anchor video frame following the second splice out point $SOP_2$, must be equal to the SPMTE 312M required splice point decoding delay SpliceDecodingDelay in order for the second splice out point $SOP_2$ to be seamless. In order for a seamless out point after a particular anchor video frame, (e.g. video frames $I_3$, $P_6$, and $P_9$ of FIG. 2) the anchor video frame immediately following the seamless out point anchor video frame (e.g. video frames $P_6$, $P_9$, and $I_{12}$ respectively) must have a decoding delay DecodingDelay equal to the splice point decoding delay SpliceDecodingDelay defined by the SMPTE 312M standard. It should be appreciated that the above encoding of a seamless splice in point also achieves the same decoding delay for I-frames. Accordingly, in an exemplary embodiment, the rate control processor 119 utilizes either the in point GOP allocation method or the following out point video frame allocation method to achieve the necessary decoding delay for an I-frame that both (i) immediately follows an seamless out point packet, and (ii) corresponds to a seamless in point.

Referring now to FIG. 7, there is depicted the out point video frame allocation method that essentially adjusts the target number of bits T allocated to video frames in order to achieve the required splice point decoding delay SpliceDecodingDelay for the anchor video frame immediately following a seamless splice out point $SOP_m$. More specifically, the rate control processor 119 in an exemplary embodiment replaces the above steps 414 and 450 of the rate control method 400 which initialize the target number of bits T for a selected video frame F with the out point video frame allocation method. The out point video frame allocation method begins in step 702 with the rate control processor 119 initializing a target number of bits T for the selected video frame F. More specifically, the rate control processor 119 initializes the target number of bits T for the selected video frame F based upon the above video frame allocation equations (10), (11), and (12) which are presented again:

$$T_i = \max\left\{\frac{R}{1 + \frac{N_p X_p}{X_i K_p} + \frac{N_b X_b}{X_i K_b}}, \frac{BitRate}{8 \times FrameRate}\right\} \quad (10)$$

$$T_p = \max\left\{\frac{R}{N_p + \frac{N_b K_p X_b}{K_b X_p}}, \frac{BitRate}{8 \times FrameRate}\right\} \quad (11)$$

$$T_b = \max\left\{\frac{R}{N_b + \frac{N_p K_b X_p}{K_p X_b}}, \frac{BitRate}{8 \times FrameRate}\right\} \quad (12)$$

The rate control processor 119 in step 703 then identifies the next desired splice out point $SOP_m$ for the video signal. In particular, the rate control processor 119 in an exemplary embodiment receives splice out point configuration information that essentially identifies desired locations in the encoded video stream for seamless splice out points. Based upon this splice out point configuration information, the rate control processor 119 may identify anchor video frames (i.e. I-frames and P-frames) of the video stream that best meet criteria of the splice out point configuration information. For example, the splice out point configuration information indicates that splice out points should be placed at 1 minute intervals with several additional splice out points temporally concentrated about typical commercial break points of a television program.

After identifying the next desired splice out point $SOP_m$ of the video stream, the rate control processor in step 704 determines whether the target number of bits T for the selected video frame F should be adjusted in order to achieve a desired decoding delay at a splice out point $SOP_m$. More specifically, the rate control processor 119 in step 704 determines whether the selected video frame F precedes the splice out point $SOP_m$ in presentation order and is in the same GOP $GOP_n$ as the video frame immediately preceding the splice out point $SOP_m$ in presentation order. For example, as depicted in FIG. 2, the P-frame $P_6$ immediately precedes the second splice out point $SOP_2$ in presentation order, each of the video frames $B_4$, $B_5$, and $P_6$ precede the second splice out point $SOP_2$ in presentation order, and each of the video frames $B_4$, $B_5$, and $P_6$ are a part of the same GOP as the last video frame immediately preceding the second splice out point $SOP_2$. Accordingly, if the selected video frame F is one of the video frames $B_4$, $B_5$, or $P_6$, then the rate control processor 119 would determine in step 704 that the target number of bits T for the selected video frame F should be adjusted in order to achieve the required decoding delay at the second splice out point $SOP_2$.

If the rate control processor 119 in step 704 determines that the target number of bits T for the selected video frame does not need adjusting, then the rate control processor 119 exits the out point video frame allocation method and returns to the rate control method 400 of FIGS. 4A–4C. Accordingly, if the target number of bits T for the selected video frame does not need adjusting, then the rate control processor 119 in executing the out point video frame allocation method essentially allocates the same target number of bits T to the selected video frame F as steps 414 and 450 of the rate control method 400.

However, if the rate control processor 119 in step 704 determines that the target number of bits T for the selected video frame F does need adjusting, then the rate control processor 119 proceeds to step 706 in order to estimate a target number of bits EstimatedTarget for encoding the selected video frame F and the video frames between the selected video frame F and the splice out point $SOP_m$ in presentation order. To this end, the rate control processor 119 in step 706 initializes a target remaining number of bits RTarget. In particular, the rate control processor 119 in an exemplary embodiment initializes the target remaining number of bits RTarget by setting the target remaining number of bits RTarget equal to the remaining number of bits R for the current GOP $GOP_n$.

After initializing the target remaining number of bits RTarget, the rate control processor 119 calculates in step 707 a separate target number of bits Target for the selected video frame F and each video frame between the selected video frame and the selected splice out point $SOP_m$. In particular, the rate control processor 119 obtains the target number of bits Target for each video frame based upon the respective following target equations (40), (41), and (42):

$$Target_i = \frac{RTarget}{1 + \frac{N_p X_p}{X_i K_p} + \frac{N_b X_b}{X_i K_b}} \quad (40)$$

$$Target_p = \frac{RTarget}{N_p + \frac{N_b K_p X_b}{K_b X_p}} \quad (41)$$

$$Target_b = \frac{RTarget}{N_b + \frac{N_p K_b X_p}{K_p X_b}} \quad (42)$$

More specifically, the rate control processor 119 first calculates the target number of bits Target for the selected video frame F based upon the appropriate target equation (40), (41), or (42). Then, the rate control processor 119 subtracts the obtained target number of bits Target for the selected video frame F in order to obtain an updated target remaining number of bits RTarget before obtaining the target number of bits Target for the next video frame preceding the splice out point $SOP_m$.

After obtaining a target number of bits Target for each video frame from the selected video frame F to the splice out point $SOP_m$, the rate control processor 119 in step 708 obtains an estimated target number of bits EstimatedTarget to encode the selected video frame F and each video frame between the selected video frame F and the splice out point $SOP_m$. More specifically, the rate control processor 119 in an exemplary embodiment adds each of the obtained target number of bits Target obtained for the video frames together in order to obtain the estimated target number of bits EstimatedTarget.

After obtaining estimated target number of bits EstimatedTarget, the rate control processor 119 in step 710 estimates the out point decoding delay $DecodingDelay_{OP}$ of the anchor video frame immediately following the splice out point $SOP_m$ in presentation order based upon the obtained estimated target number of bits EstimatedTarget. More specifically, the rate control processor 119 in an exemplary embodiment estimates the out point decoding delay DecodingDelay$_{OP}$ based upon the following out point decoding delay equation (43):

$$DecodingDelay_{OP} = \\ DecodingDelay_1 + \frac{SOPFrame\#}{FrameRate} - \frac{EstimatedTraget + BitCount}{BitRate} \quad (43)$$

where SOPFrame# represents the encode/decode video frame number of the anchor video frame immediately following the splice out point SOP$_m$.

The rate control processor 119 then in step 712 obtains a target correction factor TargetCorrection for the selected video frame F. More specifically, the rate control processor 119 in an exemplary embodiment determines the target correction factor TargetCorrection for the selected video frame F based upon the following target correction factor equation (44):

$$TargetCorrection = (DecodingDelay_{OP} - (SpliceDecodingDelay + D)) \times BitRate \quad (44)$$

where D represents a calibration constant.

The rate control processor 119 then in step 714 adjusts the target number of bits T for the selected video frame F based upon the obtained target correction factor TargetCorrection. More specifically, the rate control processor 119 in an exemplary embodiment adjusts the target number of bits T based upon the following video frame adjustment equation (45):

$$T = T_0 + TargetCorrection \times \frac{T_0}{EstimatedTarget} \quad (45)$$

where $T_0$ represents the target number of bits originally allocated to the selected video frame F in step 702.

After obtaining the adjusted remaining number of bits T for the selected video frame F, the rate control processor 119 exits the out point video frame allocation method. Moreover, the rate control processor 119 in an exemplary embodiment returns to the rate control method 400 in order to obtain an appropriate quantization value Qstep$_j$ for the current pel macroblock MB$_j$ based upon the adjusted target number of bits T for the selected video frame F.

After encoding the anchor video frame immediately preceding the splice out point SOP$_m$ in presentation order, the rate control processor 119 determines the out point decoding delay DecodingDelay$_{OP}$ for the anchor video frame following the splice out point SOP$_m$ and adjusts the encoded bit stream in order to achieve the required splice point decoding delay SpliceDecodingDelay at the splice in point SOP$_m$. More specifically, the rate control processor 119 determines the out point decoding delay DecodingDelay$_{OP}$ based upon the following out point delay equation (46):

$$DecodingDelay_{OP} = DecodingDelay_1 + \frac{SOPFrame\#}{FrameRate} - \frac{BitCount}{BitRate} \quad (46)$$

where BitCount represents the total number of bits used to encode the video stream up to the splice out point SOP$_m$.

If the decoding delay DecodingDelay is greater than the required splice point decoding delay SpliceDecodingDelay for the splice out point SOP$_m$, then the video encoder 114 adds stuffing bits to the encoded video stream. More specifically, the video encoder 114 determines the number of stuffing bits to add to the encoded video stream based upon the following bit stuffing equation (47):

$$NumStuffingBits = (DecodingDelay_{OP} - SpliceDecodingDelay) \times BitRate \quad (47)$$

where NumStuffingBits represents the number of stuffing bits required in order to achieve the required splice point delay SpliceDecodingDelay for the splice out point SOP$_m$ to be a seamless in point.

As stated above, the MPEG standard limits the number of stuffing bits which may be added. Accordingly, if the video encoder is unable to obtain the required splice point delay SpliceDecodingDelay, then the video encoder 114 marks the splice out point SOP$_m$ as a non-seamless splice out point. It should also be noted that if the out point decoding delay DecodingDelay$_{OP}$ of equation (46) is less than the required splice point delay SpliceDecodingDelay, then the video encoder 114 would also mark the splice out point SOP$_m$ as a non-seamless splice out point.

Implementation of the Video Encoder of the Present Invention

Figure 8:
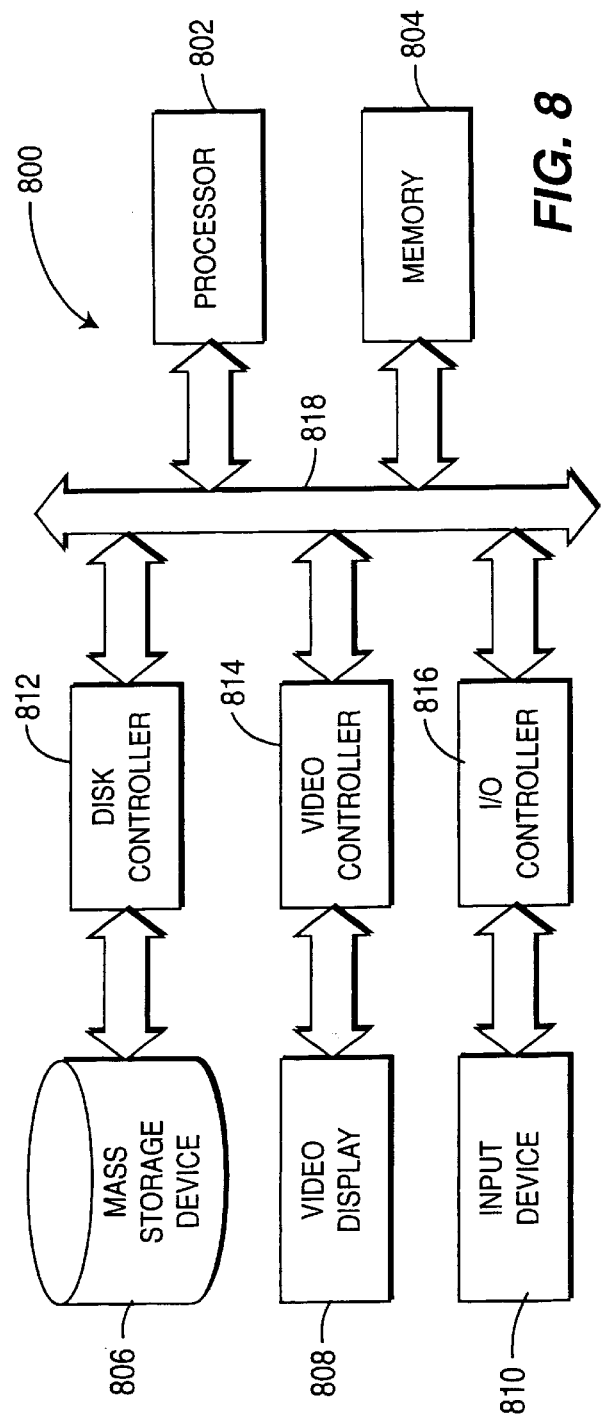
FIG. 8 shows a general processing system suitable for implementing the video encoder of FIG. 1.

It should be appreciated that the blocks of the video encoder 114 may be implemented with various hardware components such a digital signal processors, digital logic components, and analog components. Moreover, it should be appreciated that blocks of the video encoder 114 may be implemented with properly programmed general processors. For example, FIG. 8 illustrates a general processing system 800 which is suitable for implementing the video encoder 114 of the present invention. In particular, the general processing system 800 includes a processor 802, memory 804, mass storage device 806, video display 808, and input device 810. Moreover, the general processing system 800 includes a disk controller 812 for controlling the mass storage device 806, a video controller 814 for controlling the video display 808, an I/O controller 816 for controlling the input device 810, and a system bus 818. The system bus 818 operably couples the processor 802 to the memory 804, the disk controller 812, the video controller 814, and the I/O controller 816.

The memory 804 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, and hard disks. The memory 804 may also include nonvolatile computer readable medium such as PROM (programmable read only memory), EPROM (electrically PROM), EEPROM (electrically erasable PROM), and flash memory that store software routines. In particular, the memory 804 stores software and/or firmware routines which, when executed by the processor 802, cause the processor 802 to dynamically adjust the quantization used to encode a video signal in accordance with the rate control method 400.

The processor 802 is operable to execute the software routines stored in the memory 804, and communicate with the mass storage device 806, the video display 808, and the input device 810 via the disk controller 812, the video controller 814, and the I/O controller 816 respectively. Most importantly, the processor 802 is operable to execute software routines of the memory 804 which cause the processor 802 to implement the functionality of the video encoder 114.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected. For example, the video encoder 114 may simultaneously implement both the in point GOP allocation method and the out put frame allocation method in order to obtain an encoded video stream having both seamless in points and seamless out points. Moreover, the video encoder 114 may use the GOP allocation technique of method to achieve seamless out points at GOP boundaries. Furthermore, as eluded to above, video encoder 114 may use the frame allocation technique of method to achieve seamless in points.

What is claimed is:

1. A method of encoding a video signal to obtain an encoded video stream having seamless splice points, said encoded video stream having a presentation order and an encode order, said method comprising the steps of:
    a) allocating a number of bits to a first group of pictures (GOP) comprising a first plurality of video frames of said video signal that precedes a desired splice point in presentation order;
    b) determining an estimated decoding delay for a first video frame of said video signal that follows said desired splice point in encode order;
    c) determining a correction factor that is based upon a difference between said estimated decoding delay for said first video frame and a splice point decoding delay, said splice point decoding delay being a delay necessary for said first video frame in order to achieve a seamless splice point at said desired splice point;
    d) adjusting said number of bits allocated to said first GOP based upon said correction factor to obtain an adjusted number of bits for said first GOP; and
    e) encoding said first plurality of video frames based upon said adjusted number of bits allocated to said first GOP.

2. The method of claim 1, wherein step c) further comprises the steps of:
    c1) determining a total bit adjustment needed in order to achieve a decoding delay for said first video frame that is substantially equal to said splice point decoding delay;
    c2) determining a remaining number of GOPs to be encoded before said desired splice point; and
    c3) determining said correction factor for said first GOP based upon said total bit adjustment, said remaining number of GOPs, and said number of bits allocated to said first GOP.

3. The method of claim 1, further comprising the steps of:
    determining prior to step d), that said first GOP is within a predetermined number of GOPs of said desired splice point.

4. The method of claim 1, wherein step e) further comprises the steps of:
    e1) allocating a target number of bits to a second video frame of said first GOP based upon said adjusted number of bits allocated to said first GOP;
    e2) obtaining an actual bit distribution indicative of a number of bits used to encode each pel block of a third video frame of said video signal that precedes said second video frame in encode order;
    e3) determining a quantization value for a pel block of said second video frame based upon said actual bit distribution of said third video frame and said target number of bits allocated to said second video frame; and e4) encoding said pel block of said first video frame based upon said quantization value.

5. The method of claim 1, wherein step e) further comprises the steps of:
    e1) allocating a target number of bits to a second video frame of said first GOP based upon said adjusted number of bits allocated to said first GOP;
    e2) obtaining an actual bit distribution indicative of a number of bits used to encode each pel block of a third video frame of said video signal that precedes said second video frame in encode order;
    e3) adjusting said actual bit distribution based upon said target number of bits allocated to said second video frame to obtain a normalized bit distribution in which a total number of bits represented by said normalized bit distribution is substantially equal to said target number of bits allocated to said second video frame;
    e4) determining a quantization value for a pel block of said second video frame based upon said normalized bit distribution; and
    e5) encoding said pel block of said second video frame based upon said quantization value.

6. A computer readable medium for obtaining an encoded video stream having seamless splice points, said encoded video stream having a presentation order and an encode order, said computer readable medium comprising code which when executed by a video encoder causes said video encoder to:
    a) allocate a number of bits to a first group of pictures (GOP) comprising a first plurality of video frames of a video signal that precedes a desired splice point in presentation order;
    b) determine an estimated decoding delay for a first video frame of said video signal that follows said desired splice point in encode order;
    c) determine a correction factor based upon a difference between said estimated decoding delay for said first video frame and a splice point decoding delay, said splice point decoding delay being a delay necessary for said first video frame to achieve a seamless splice point at said desired splice point;
    d) adjust said number of bits allocated to said first GOP based upon said correction factor; and
    e) encode said first plurality of video frames based upon said number of bits allocated to said first GOP.

7. The computer readable medium of claim 6, wherein said code when executed by said video encoder further causes said video encoder to determine said correction factor by:
    determining a total bit adjustment needed in order to achieve a decoding delay for said first video frame that is substantially equal to said splice point decoding delay;
    determining a remaining number of GOPs to be encoded before said desired splice point; and
    determining said correction factor for said first GOP based upon said total bit adjustment, said remaining number of GOPs, and said number of bits allocated to said first GOP.

* * * * *